(12) United States Patent
Oohashi et al.

(10) Patent No.: US 6,664,669 B2
(45) Date of Patent: Dec. 16, 2003

(54) A.C. GENERATOR FOR VEHICLE AND A METHOD OF PRODUCING THE SAME

(75) Inventors: Atsushi Oohashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,095

(22) Filed: Jun. 13, 2001

(65) Prior Publication Data

US 2002/0130563 A1 Sep. 19, 2002

(30) Foreign Application Priority Data

Mar. 13, 2001 (JP) ......................................... 2001-070080

(51) Int. Cl.⁷ ............................ H02K 1/16; H02K 15/10
(52) U.S. Cl. ........................... 310/45; 310/179; 310/254
(58) Field of Search ........................... 310/45, 179, 180, 310/254; 29/596

(56) References Cited

U.S. PATENT DOCUMENTS

| | | | |
|---|---|---|---|
| 2,407,935 A | * | 4/1946 | Perfetti et al. |
| 3,646,374 A | * | 2/1972 | Jordan et al. |
| 5,043,612 A | * | 8/1991 | Lakin |
| 5,658,660 A | * | 8/1997 | Teshima et al. |
| 6,211,584 B1 | * | 4/2001 | Kurosawa et al. |

FOREIGN PATENT DOCUMENTS

| | | | | |
|---|---|---|---|---|
| JP | 56-3557 | * | 1/1981 | .......... H02K/15/12 |
| JP | 1-278242 | * | 11/1989 | ............ H02K/1/04 |
| JP | 2-136047 | * | 5/1990 | ............ H02K/3/34 |
| JP | 5-83901 | * | 9/1991 | ............ H02K/5/24 |
| JP | 9-121493 | * | 5/1997 | ............ H02K/3/34 |
| JP | 2000-14049 | * | 1/2000 | .......... H02K/15/12 |
| JP | 2000-050553 | * | 2/2000 | ............ H02K/3/34 |
| JP | 2000-92578 | | 3/2000 | |

* cited by examiner

Primary Examiner—Burton Mullins
(74) Attorney, Agent, or Firm—Sughrue Mion, PLLC

(57) ABSTRACT

A stator iron core 21 is formed by laminated iron cores 21a, in which a plurality of slots 24 are shaped with predetermined pitches in a peripheral direction. At least a portion of the laminated iron cores 21a corresponding to an end surface 27 of the stator iron core and inner peripheral walls of the slots 24 are coated with an insulative resin 100 to insulate the stator iron core 21 from a stator winding 22, whereby an insulating capability between the slots and the winding is high, and an a.c. generator for vehicle is easily produced with a low cost.

16 Claims, 11 Drawing Sheets

AIR    POWDER
51
52

ABSTRACT# A.C. GENERATOR FOR VEHICLE AND A METHOD OF PRODUCING THE SAME

BACKGROUND OF THE INVENTION

1. Field of the Invention

The present invention relates to an a.c. generator for a vehicle, which is driven by an internal combustion engine of the vehicle, and a method of producing the a.c. generator.

2. Discussion of Background

FIG. 12 is a cross-sectional view of an example of generally used a.c. generators for vehicles, which is disclosed in Japanese Unexamined Patent Publication JP-A-2000-50553. In the figure, a rotator 1 has a rotating shaft 11, a pair of field iron cores 12 of a Randle type, engaged with the rotating shaft 11, and a field winding 13, fixed to the field iron cores 12. The rotating shaft 11 is rotated by receiving a driving force by the internal combustion engine of the vehicle through a belt (not shown).

A stator 2 surrounding the rotator 1 has a stator iron core 21 and a group of stator windings 22, fixed to the stator iron core 21. An inner peripheral surface of the stator 2 is arranged opposite to an outer peripheral surface of the rotator 1 through a gap. Further, the stator 2 is interposed and held between a front bracket 31 and a rear bracket 32.

In the next, the stator 2 will be described in detail. FIG. 13 is a perspective view of a conductor segment, forming the group of the stator windings 22, wherein a state before building this in the stator iron core 21 is shown. In the figure, the conductor segment 23 is formed by bending a rod-like or plate-like metallic material, e.g. copper, at a bent portion 23c so as to be substantially U-like shape. The conductor segment 23 has a conductor 23a on an inner layer side, arranged on a side of a slot inner than the bent portion 23, and a conductor 23b on an outer layer side, arranged on a side of a slot outer than the bent portion 23.

FIG. 14 is a cross-sectional view of a part of the stator iron core 21. FIG. 15 is a perspective view of party illustrating a state that the windings are inserted in the stator iron core 21. The group of the stator windings 22 is formed by inserting two pieces of the conductor segments 23 respectively into each one of the slots 24 of the stator iron core 21, and by mutually shaping end portions 23d of the conductor segments, which were inserted in different slots 24, as illustrated in FIG. 15. An insulating coating is respectively formed on surfaces of the conductor segments 23, and therefore adjacent conductor segments 23 are insulated each other by the insulating coatings. Further, each of the conductor segments 23 is insulated from a corresponding inner wall surface of the slot 24 by a tissue paper 25.

FIGS. 16 through 18 illustrate a method of producing the stator winding, wherein the tissue paper 25 is omitted. The tissue paper 25 is shaped like a ring sufficient for one slot, and inserted in the slot along an axial direction of the slot 24. After building the tissue paper 25 in the slot 24, the conductor segment is inserted in the slots 24 along the axial direction, as arrows A in FIG. 16. The inserted conductor segment 23 protrudes from the other side surface of the slot 24 at an end portions 23d, and the end portions 23d are bent in peripheral directions of the stator iron core 21 as arrows B, i.e. twist shaping, to connect another end portion 23d of a conductor segment 23, inserted in a different slot 24.

However, there are problems in the conventional a.c. generator for the vehicle that a material cost of the tissue paper 25 is required because the conductor segments are insulated from the stator iron core 21 by the tissue paper 25, the number of steps in manufacturing the a.c. generator is increased, and therefore a cost is increased.

Further, as illustrated in FIG. 16, when the conductor segment 23 is inserted in the directions of the arrows A into the slots 24 of the stator iron core 21 and when the conductor segment 23 is bent in the directions of the arrows B at a time of twist-shaping as illustrated in FIG. 17, the tissue paper 25 and the insulating coating of the conductor segment 23 are peeled off by a contact between an opening edge of the stator iron core 21 on the end surface 27 and the conductor segment 23, whereby a resistance to voltage is deteriorated.

Further, as illustrated in FIG. 17, when the conductor segment 23 is bent in the directions of the arrows B at the time of twist-shaping, an excessive stress is applied to the end portion 27 of the stator iron core 21, whereby there are problems that laminated steel plates forming teeth 28 are deformed and shifted in peripheral directions on an inner diameter side of the stator iron core 21, a magnetic circuit is affected, and therefore an output voltage is decreased.

Further, although the tissue papers 25 are interposed between the stator iron core 21 and the conductor segments 23, gaps still exist between inner wall surfaces of the slots 24 and the tissue papers 25. Therefore, there is a problem that a quality of the a.c. generator for vehicle is deteriorated by a shift of the conductor segment 23 at a time of inserting this, insufficient insulation caused by intrusion of moisture into the gaps, and deterioration of heat conductivity (cooling capability) between the conductor segments 23 as electric heating elements and the stator iron core 21.

SUMMARY OF THE INVENTION

It is an object of the present invention to solve the above-mentioned problems inherent in the conventional technique and to provide an a.c. generator for a vehicle which has high insulating and cooling capabilities of a stator, is easily manufactured, has a high quality, and is produced at a low cost, and also to provide a method of manufacturing the a.c. generator.

According to a first aspect of the present invention, there is provided an a.c. generator for a vehicle comprising: a rotator; a stator iron core arranged opposite to an outer periphery of the rotator and having a plurality of slots; and a stator including a plurality of conductor segments, which are accommodated in the slots to form a stator winding, wherein the stator iron core is insulated from the conductor segments by coating at least an end surface of the stator iron core and an inner wall surfaces of the slots with an insulating resin.

According to a second aspect of the present invention, there is provided the a.c. generator for the vehicle, wherein the insulative resin is formed around opening edges of the slots on sides of the end surfaces of the stator iron core so as to be in a rounded shape or a chamfered shape.

According to a third advantage of the present invention, there is provided the a.c. generator for the vehicle, wherein the stator iron core is formed to be in a rounded shape or a chamfered shape around opening edges of the slots on sides of the end surfaces of the iron core.

According to a fourth aspect of the present invention, there is provided the a.c. generator for the vehicle, wherein the insulative resin is made thicker at around opening edges of the slots on sides of the end surfaces of the stator iron core than at center portions of the slots in their axial directions.

According to a fifth aspect of the present invention, there is provided the a.c. generator for the vehicle, wherein the conductor segments have a substantially rectangular cross-sectional shape.

According to a sixth aspect of the present invention, there is provided the a.c. generator for the vehicle, wherein the end surfaces of the stator iron core are shaped to be uneven.

According to a seventh aspect of the present invention, there is provided the a.c. generator for the vehicle, wherein the inner wall surfaces of the slots are shaped to be uneven.

According to an eighth aspect of the present invention, there is provided the a.c. generator for the vehicle, wherein the insulative resin has a breaking strength sufficient to withstand breakage, caused at a time of inserting the conductor segments into the slots.

According to a ninth aspect of the present invention, there is provided the a.c. generator for the vehicle, wherein the insulative resin includes silicone.

According to a tenth aspect of the present invention, there is provided the a.c. generator for the vehicle, wherein the insulative resin includes epoxy.

According to an eleventh aspect of the present invention, there is provided a method of manufacturing an a.c. generator for a vehicle comprising steps of: forming a stator iron core by laminating annular steel sheets, in which a shape of slots is punched out; and coating at least inner wall surfaces of the slots and end surfaces of the stator iron core from axial directions of the stator iron core with an insulative resin.

According to a twelfth aspect of the present inventions, there is provided the method of manufacturing the a.c. generator for the vehicle, wherein the coating of the insulative resin is provided by electrostatic powder coating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 11 as follows, wherein the same numerical references are used for the same or similar portions and description of these portions is omitted.

Embodiment 1

Figure 1:
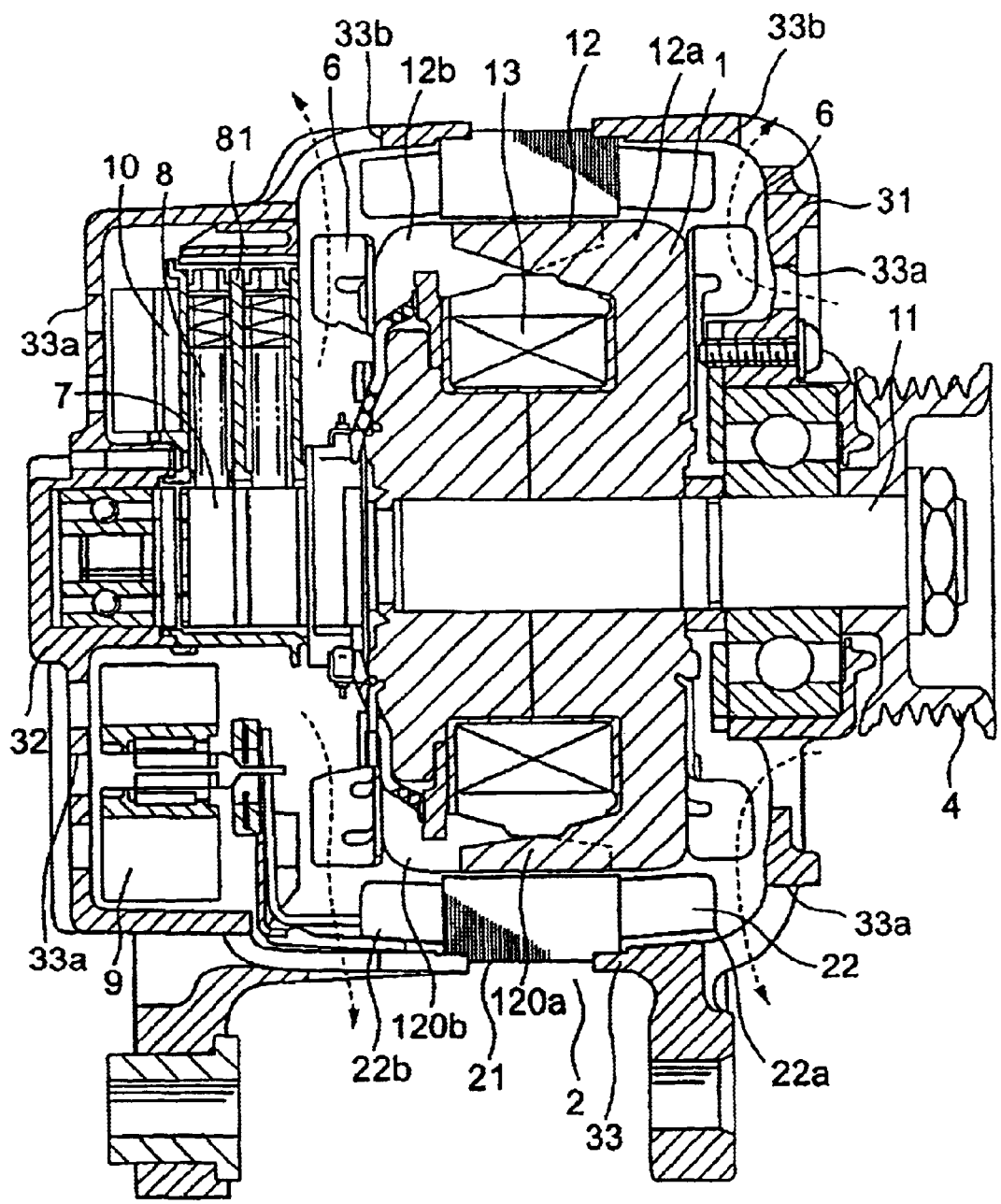
FIG. 1 is a side cross-sectional view illustrating an a.c. generator for a vehicle according to Embodiment 1 of the present invention.
Figure 2:
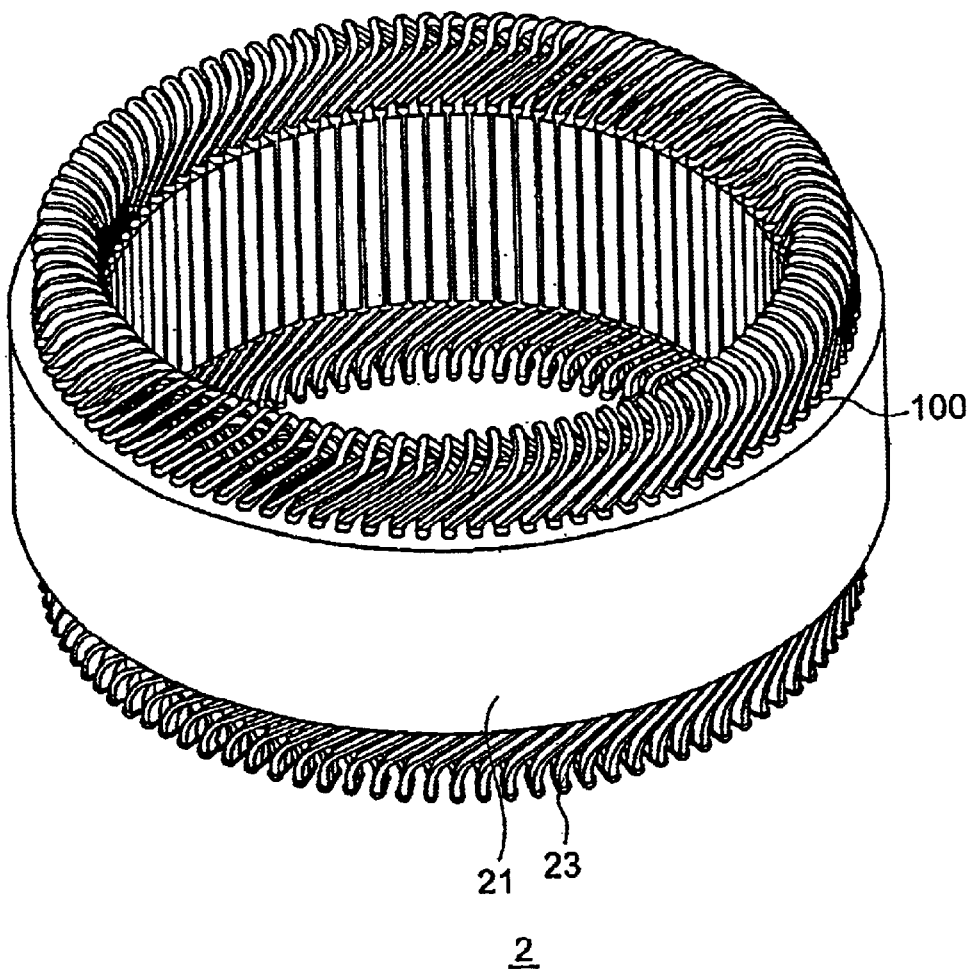
FIG. 2 is a perspective view illustrating a stator of the a.c. generator for the vehicle according to Embodiment 1 of the present invention.
Figure 3:
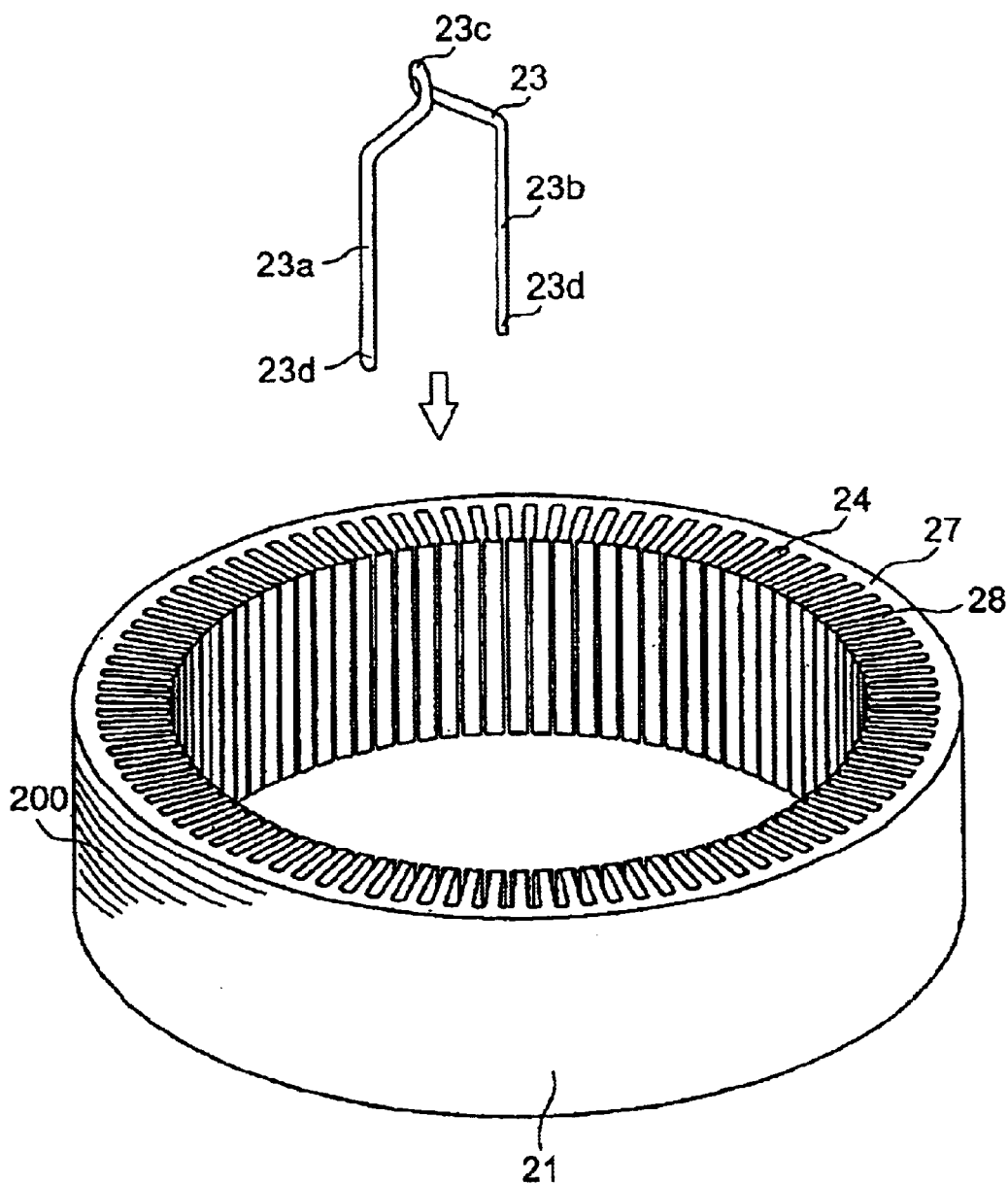
FIG. 3 is a perspective view of a stator iron core of the a.c. generator for the vehicle according to Embodiment 1 of the present invention.

FIG. 1 is a cross-sectional view of an a.c. generator for a vehicle according to Embodiment 1 of the present invention. FIG. 2 is a perspective view of a stator. FIG. 3 is a perspective view of a stator iron core.

The a.c. generator for the vehicle has a casing 33, constituted by a front bracket 31 made of aluminum and a rear bracket 32 made of aluminum, a rotating shaft 11, to one end of which a pulley 4 is fixed and which is located inside the casing 33, a Randle-type rotator 1 fixed to the rotating shaft 11, fans 6 fixed on both side surfaces of the rotator 1, a stator 2 fixed to an inner wall surface of the casing 33, a slip ring 7 for supplying an electric current to the rotator 1, which slip ring 7 is fixed to an end portion of the rotating shaft 11 other than the end to which the rotator 1 is fixed, a pair of brushes 8, which slide on the slip ring 7, a brush holder 81 accommodating the brushes 8, and a regulator 10, which is electrically connected to the stator 2 to adjust a magnitude of an a.c. voltage, generated in the stator 2.

An intake air port 33a for taking a cooling air into the casing 33 by rotation of the fan 6 and an exhaust air port 33b for exhausting the cooling air to an outside are formed in the casing 33. Further, an intermediate portion of the stator iron core 21 is externally exposed.

The rotator 1 has a rotator winding 13 for generating a magnetic flux by applying an electric current and a pole core 12, formed so as to cover the rotator winding 13 to form a magnetic pole by the magnetic flux. The pole core 12 is formed by a first pole core 12a and a second pole core 12b, which are mutually engaged so as to be paired. The first pole core 12a and the second pole core 12b are made of iron and respectively have a claw-like magnetic pole 120a and a claw-like magnetic pole 120b.

The stator 2 includes a stator iron core 21, through which a rotating magnetic field, generated by the rotator 1, passes, and a group of stator windings 22, formed by connecting a plurality of mutually connected conductor segments 23 for passing an output electric current, wherein the plurality of conductor segments 23 are built in the stator iron core 21. The stator iron core 21 is formed by laminating belt-like steel plates 200 having a plurality of teeth 28 at equal intervals, which steel plates are formed by punching out. The group of stator windings 22 is formed, as in the conventional technique, by inserting the conductor segments 23 respectively in the slots 24 of the stator iron core 21 and shaping end portions 23d of the conductor segments 23, which are inserted in different slots 24.

In the conventional technique, the conductor segments 23 of the stator 2 are electrically insulated from the inner wall surfaces of the slots 24 by the tissue papers 25. However, in the present invention, the tissue papers 25 are abolished, and the stator iron core 21 is coated with an insulative resin 100, whereby the conductor segments 23 are electrically insulated from the inner wall surfaces of the slots 24.

Figure 4:
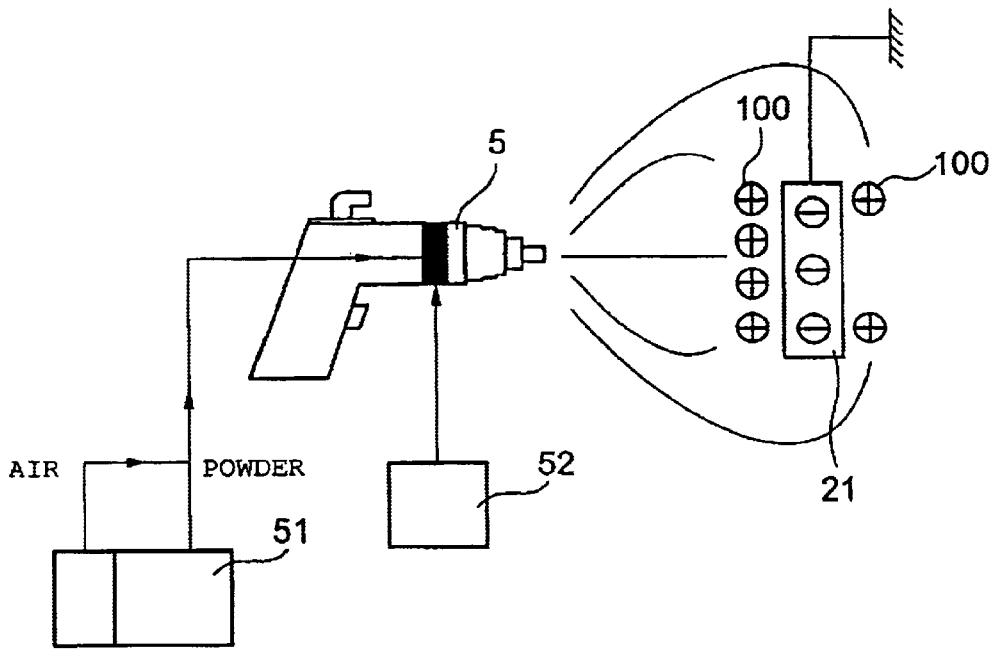
FIG. 4 schematically illustrates an electrostatic powder coating device for coating an insulative resin on the stator iron core of the a.c. generator for the vehicle according to Embodiment 1 of the present invention.

It is preferable to coat an insulative resin including epoxy by electrostatic powder coating. An epoxy resin is apt to sweep into an object to be coated to facilitate even coating. FIG. 4 illustrates a structure of a generally-known electrostatic powder coating device. As illustrated in FIG. 4, a powdered paint, e.g. an epoxy resin as the insulative resin 100, supplied to an electrostatic gun 5 by a supplier 51, is electrified by a d.c. high voltage obtained in an electrostatic generator 52, and the object to be coated is coated with the electrified resin, i.e. the iron core 21, by an air supplied to the electrostatic gun 5 from the supplier 51. The stator iron core 21 is earthed, and therefore the electrified epoxy resin is deposited on the grounded stator iron core 21 by an electrostatic attraction. A predetermined portion of the stator iron core 21 is masked to coat the epoxy resin at least an end surface 27 and the inner wall surfaces of the stator iron core 21 with the epoxy resin. After coating the resin, the coating of the epoxy resin coated on the stator iron core 21 is subjected to melting by heating in a baking furnace and curing to form a continuous coating by cure.

Figure 5:
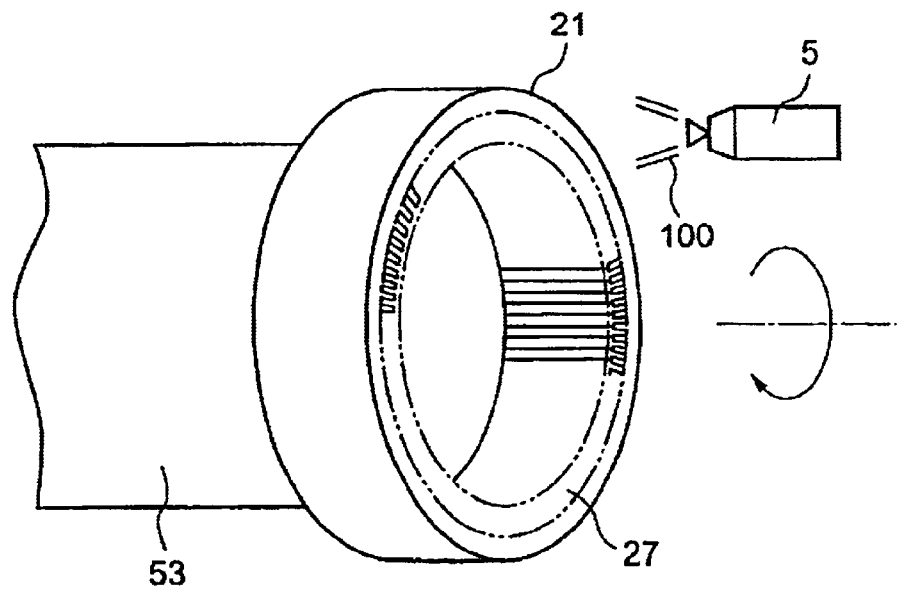
FIG. 5 schematically illustrates a method of coating the insulative resin on the stator iron core of the a.c. generator for the vehicle according to Embodiment 1 of the present invention.

As illustrated in FIG. 5, a direction of coating with the insulative resin 100 is preferably from an axial direction of the stator iron core 21. By coating from an inner diameter side of the stator iron core 21 to a periphery, because opening portions of the teeth 28 forming the slots 24 on an inner peripheral side are narrow, the insulative resin 100 does not easily reach depths of the slots 24. However, by coating from the axial direction of the stator iron core 21, such a problem does not occur. As illustrated in FIG. 5, the stator iron core 21 is coated by the electrostatic gun while rotating the stator iron core 21, which is engaged with a jig 53.

Two of the conductor segments 23 are inserted in the axial direction of the stator 2 into the slots 24 of the stator iron core 21, coated with the insulative resin 100. The end portions 23d of the conductor segments 23, which are inserted in the different slots 24, are mutually shaped, whereby the stator 2 illustrated in FIG. 1 is obtainable. Accordingly, the coating of the insulative resin 100 on the stator iron core 21, electrically insulates the conductor segments 23 from the inner wall surfaces of the slots 24.

As described, in use of the insulative resin 100 without using the conventionally used tissue paper 25 to electrically insulate the conductor segments 23 from the inner wall surfaces of the slots 24, the following effects are obtainable.

The insulating material is not misaligned at a time of inserting the conductor segments 23 from the axial direction of the stator 2, the stator is easily produced, and it is possible to certainly insulate the conductor segments 23 from the inner wall surfaces of the slots. Further, it is possible to prevent damages of the insulative resin 100 and of the conductor segments 23, caused by contacts between opening edges of the stator iron core 21 on the end surface side 27 and the conductor segments 23 at a time of twist-shaping, whereby an insulating capability is improved.

Further, a cost is reduced in use of the insulative resin 100 instead of using the tissue paper 25, whereby a production cost can be reduced. Although a work of one by one inserting annular tissue papers 25 into the slots takes a lot of trouble, by substituting the work for that using the insulative resin 100, the inner wall surfaces of the slots 24 and the end surface 27 of the stator iron core 21 are simultaneously insulated, whereby a manufacturing process is drastically simplified.

Further, a cooling capability is improved because a heat from the coil is effectively transmitted to the stator iron core 21. A flow of the cooing air from the fan 6 is taken in from the intake port 33a, cools a commutator 9 and a regulator 10 as heating elements by passing through in the vicinity of these, passes from an inner diameter side to an outer diameter side between fan blades 6 on both of a front portion and a rear portion, cools a front coil end 22a and a rear coil end 22b of the group of stator windings 22, and is exhausted from the exhaust port 33b. In other words, the coil ends of the group of stator windings 22, of which output performance is affected by a high temperature, are located between the fan blades 6a and the exhaust port 33b of the bracket so as to be certainly cooled. The cooling air from the fan 6 reaches the end surface 27 of the stator iron core 21 to cool the coils, exposed at the coil ends 22a and 23b, and also cool the end surface 27 of the stator iron core 21. When the tissue paper 25 is used, heat conductivity is deteriorated because of a low coefficient of thermal conductivity of the tissue paper and an air intervening in a contact portion between the tissue paper 25 and the inner wall surface of the slot 24. However, because the insulative resin 100 has a coefficient of thermal conductivity higher than that of the tissue paper 25, and the insulative resin 100 is fixed to the inner wall surface of the slot 24 without interposing an air space, a heat from the coil is effectively transmitted to the stator iron core 21, and a heat can be dissipated from the end surface 27 of the stator iron core 21, receiving a cooling air.

Further, since the tissue paper 25 is not tightly fixed to the inner wall surface of the slot 24, when a water and so on flow from an outside, there is a danger that rust is produced by moisture, deposited on the stator iron core 21 and the insulation becomes insufficient. However, when the insulative resin is used, since the insulative resin 100 is completely fixed to the inner wall surface of the slot 24, moisture does not intrude and therefore an anti-rust effect is conspicuous.

Figure 6:
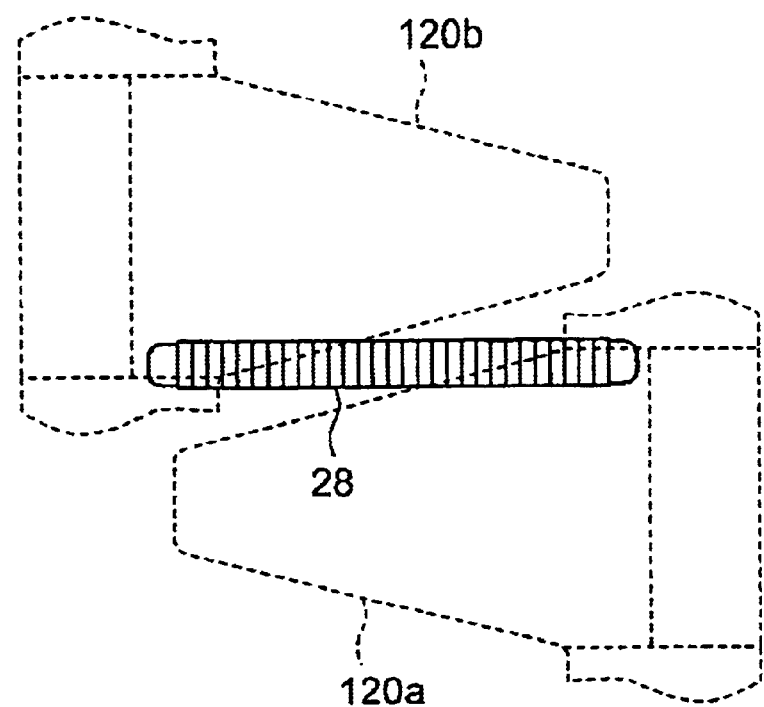
FIG. 6 illustrates a relationship between one of teeth of the stator iron core and claw-like magnetic poles of the a.c. generator for the vehicle according to Embodiment 1 of the present invention.

Further, it is possible to prevent the laminated steel plates, forming the teeth 28, from deforming in their peripheral direction. When the insulative resin 100 is coated, a rigidity of the stator iron core 21 is enhanced by the insulative resin 100, and it is possible to prevent the teeth 28 from mechanically deforming. Further, by preventing the mechanical deformation of the teeth 28, it is possible to prevent an output voltage from decreasing without disrupting a magnetic field. As illustrated in FIG. 6, when the teeth 28 are arranged in a center between claws of the claw-like magnetic poles 120a and 120b having different polarities, both ends of the plurality of the teeth 28, formed in the stator iron core 21, are arranged so as to respectively overlap the claw-like magnetic poles 120a and 120b having different polarities and positioned adjacent in a rotating direction of the rotator 1 so as to be opposite each other when viewed from a radial direction of the rotator. Magnetism applied from the claw-like magnetic poles to one of the teeth 28 forms a magnetic circuit from the outer diameter portion of the stator iron core 21 to another teeth 28 apart by a magnetic pole pitch. Accordingly, by preventing the teeth 28 from mechanically deforming, disruption of the magnetic circuit, caused by bend of the teeth 28 in the peripheral direction, can be prevented, and a drop of the output voltage can be prevented. Further, an electromagnetic sound can be reduced.

Although, in Embodiment 1, the epoxy resin is used as the insulative resin 100, an insulative resin including silicone may be used. The insulative resin including silicone has an attenuation coefficient higher than that of the insulative resin including epoxy, whereby it is possible to prevent a crack of the insulative resin 100, caused by rotation oscillation by the generator, from occurring. Further, an electromagnetic sound can be reduced by an effect of attenuating the oscillation.

Further, it is desirable to use the insulative resin including silicone having a breaking strength of 1 MPa or more, preferably 2 through 3 MPa. A maximum stress applied to the resin in the contact portion between the coil and the stator iron core 21, caused by inserting the coil into the slot 24, is generally about 1 MPa. If the maximum stress, applied to the resin in the contact portion between the coil and the stator iron core 21 is suppressed, a resin having a lower breaking strength can be used.

Further, in Embodiment 1, cross-sectional shapes of coils of the conductor segments are preferably a rectangle rather than a circle. At the time of twist-shaping of the conductor segments 23, the conductor segments 23 are in contact with the opening edge and the vicinity of the slots 24, whereby the insulative resin 100, coated on the conductor segments 23 and the opening edge and the vicinity of the slots 24 on the side of the end surface 27 of the iron core, is easily damaged. Especially, in a case of the conductor segments having the circular cross-sectional shapes, the conductor segments 23 are in contact with the opening edges of the slots 24 at points because of the circular shapes. Therefore, excessive stresses are applied in the contact portions. However, when the conductor segments having the rectangular cross-sectional shapes are used, the conductor segments 23 are in contact with the opening edges of the slots 24 on lines, whereby it is possible to prevent excessive stresses from being applied at the contact portions. Further, in use of the rectangular conductor segments 23, contact areas with the inner wall surfaces of the slots 24 are increased, whereby a heat from the coil can be effectively dissipated to the stator iron core 21 so as to improve a cooling capability. Further, by reducing a dimension of the conductor segment 23 on the bending side at the time of shaping, the coil can be easily bent to facilitate the production.

Further, similar effects are obtainable by using various conductor segments having a substantially J-like shape, substantially I-like shape, and so on besides the substantially U-like shape illustrated in FIG. 3.

Embodiment 2

Figure 7:
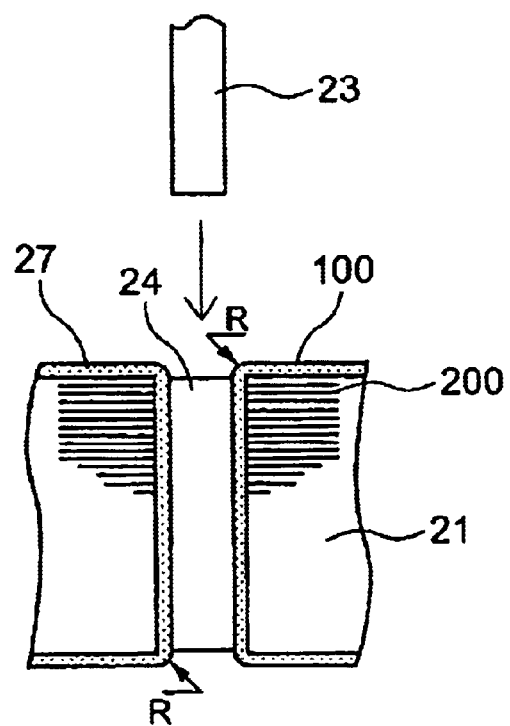
FIG. 7 is a cross-sectional view of a part of a stator iron core including a slot of an a.c. generator for a vehicle according to Embodiment 2 of the present invention.
Figure 8:
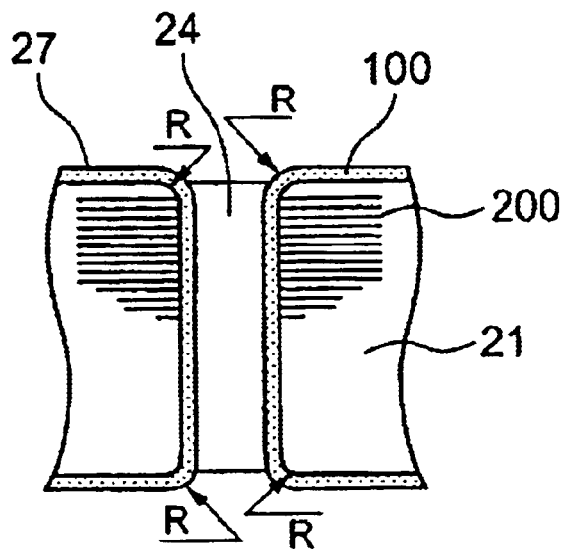
FIG. 8 is a cross-sectional view of a part of another stator iron core including a slot of the a.c. generator for the vehicle according to Embodiment 2 of the present invention.
Figure 9:
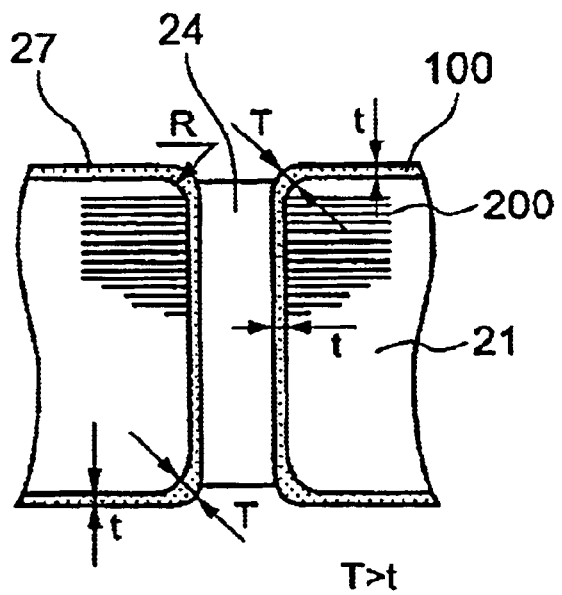
FIG. 9 is a cross-sectional view of a part of another stator iron core including a slot of an a.c. generator for the vehicle according to Embodiment 2 of the present invention.

FIGS. 7 through 9 illustrate cross-sectional views of a part of a slot in a stator iron core of an a.c. generator for a vehicle according to Embodiment 2 of the present invention. As illustrated in FIG. 7, it is preferable to coat the vicinity of an opening end of the slots 24 at an end surface 27 of the stator iron core 21 with an insulative resin so that the insulative resin is formed to have a rounded shape. When a conductor segment 23 is inserted in an axial direction of the stator iron core 21 along an arrow in FIG. 7, the conductor segment 23 receives a largest pressure force in the vicinity of the opening edge of the slot 24, whereby there is a danger that an insulative coating of the conductor segment 23 is damaged and an insulating capability is deteriorated. Further, when end portions 23d of the conductor segments 23, inserted in different slots 24, are mutually shaped, there is a danger that the conductor segments 23 are in contact with opening edges and vicinities thereof, whereby there is a danger that the insulative coating is damaged by excessive stresses generated therein. Accordingly, by forming the insulative resin coating to be in the rounded shape at these portions, it is possible to make the insertion of the conductor segment 23 smooth, reduce damages of the conductor segments 23 at around the opening edges of the slots 24 to prevent the damages of the insulative coating, and improve an insulation capability.

Further, as illustrated in FIG. 8, by previously forming the opening edge of the slot 24 on the end surface 27 of the stator iron core 21 to be a rounded shape, the coating of insulative resin can be easily formed in a similar rounded shape. Further, for example, the opening edge may be formed in a tapered shape by inserting a wedge-like pressing jig in the opening portion of the slot 24 instead of forming the rounded shape.

Further as illustrated in FIG. 9, it is preferable to make the insulative resin 100 in the opening edge and the vicinity thereof of the slot 24 thicker than in a central portion of the slot 24 in an axial direction of the stator. As described, when the conductor segment 23 is inserted in the axial direction of the stator iron core 21, the largest pressure force is applied to the opening edge of the slot 24 and the vicinity thereof. Further, when the end portions 23d of the conductor segments 23, inserted in different slots 24, are mutually shaped, the conductor segments 23 are in contact with the opening edges of the slots 24 and the vicinities thereof, whereby excessive stresses are applied. In other words, the insulative resin 100 coated on the opening edges of the slots 24 and the vicinities thereof is damaged with a highest probability. Accordingly, by making a part of the insulative resin 100 at this point thicker than a part of the insulative resin 100 inside the slot 24, the insulative resin in the opening edge of the slot 24 and the vicinity thereof is scarcely susceptible to damage, whereby an insulating capability is improved.

Embodiment 3

Figure 10:
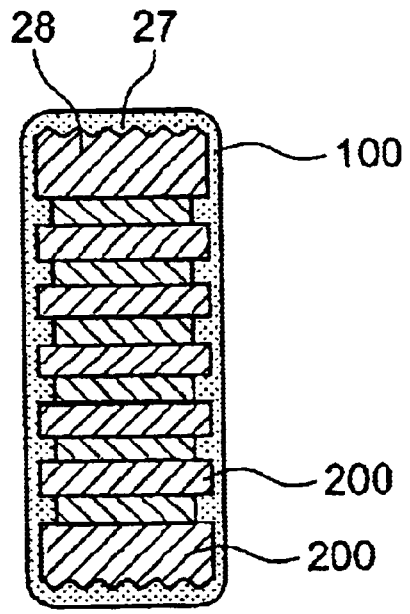
FIG. 10 is a cross-sectional view of a stator iron core of an a.c. generator for a vehicle at one of the teeth according to Embodiment 3 of the present invention.

FIG. 10 is a cross-sectional view of part of one of teeth of a stator iron core of an a.c. generator for a vehicle in a peripheral direction according to Embodiment 3 of the present invention. As illustrated in FIG. 10, an end surface 27 of the stator iron core 21 is formed to be uneven, whereby a contact between the end surface 27 of the stator iron core 21 and the insulative resin 100 becomes further tight, and peeling of the insulative resin 100 is prevented at times of inserting a conductor segment 23 into a slot 24 and of shaping conductor segments.

Figure 11:
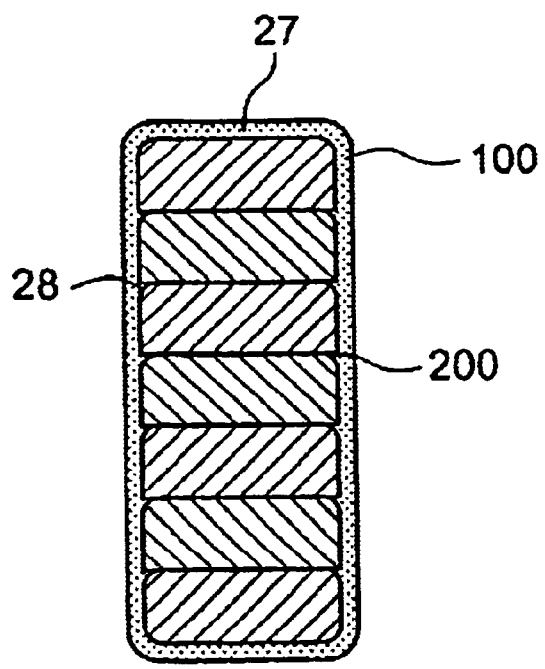
FIG. 11 is a cross-sectional view of another stator iron core of the a.c. generator for the vehicle according to Embodiment 3 of the present invention at one of the teeth.
Figure 12:
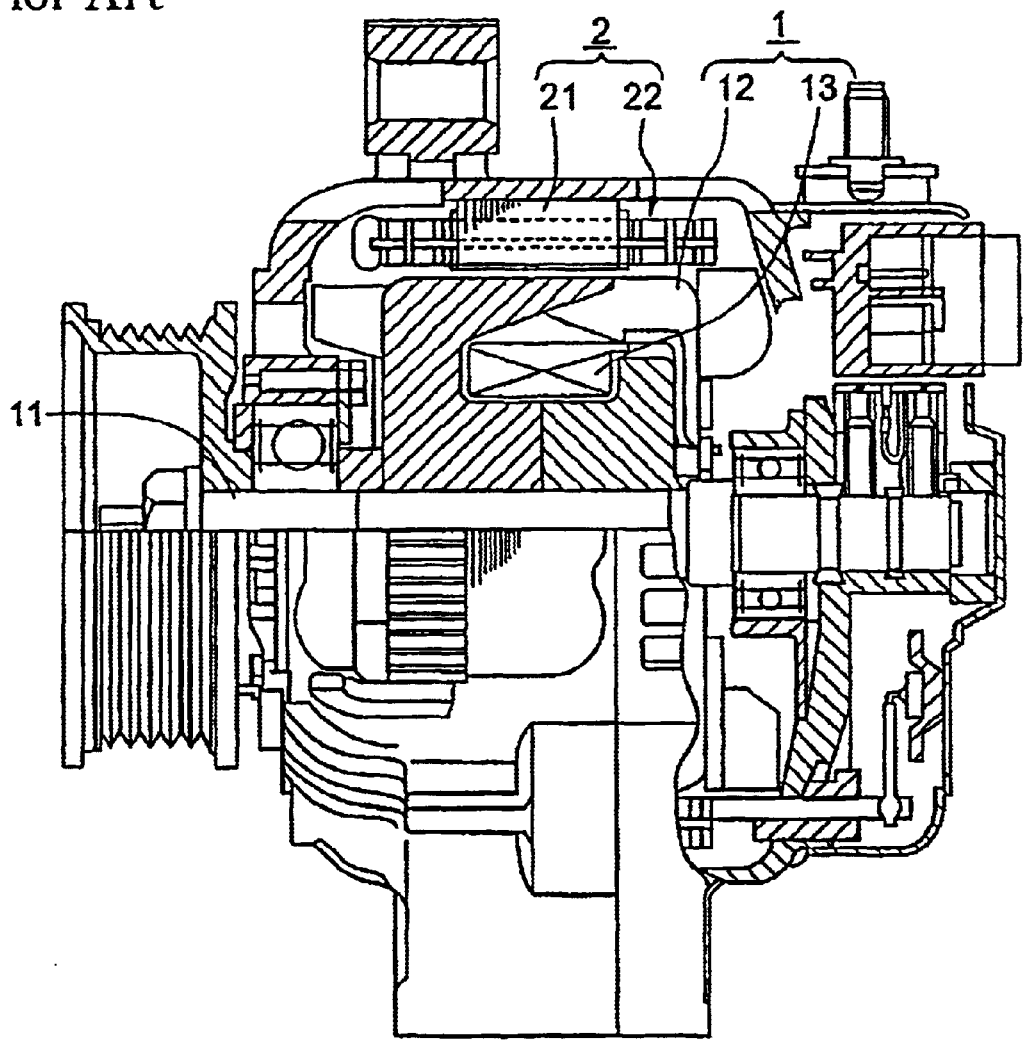
FIG. 12 is a cross-sectional view illustrating the conventional a.c. generator for vehicle.
Figure 13:
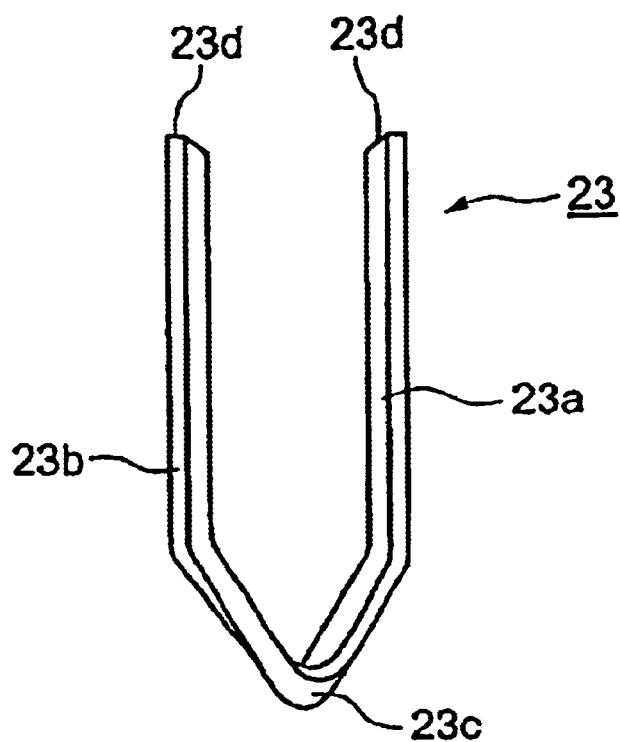
FIG. 13 is a perspective view illustrating the conductor segment used in the conventional a.c. generator for vehicle.
Figure 14:
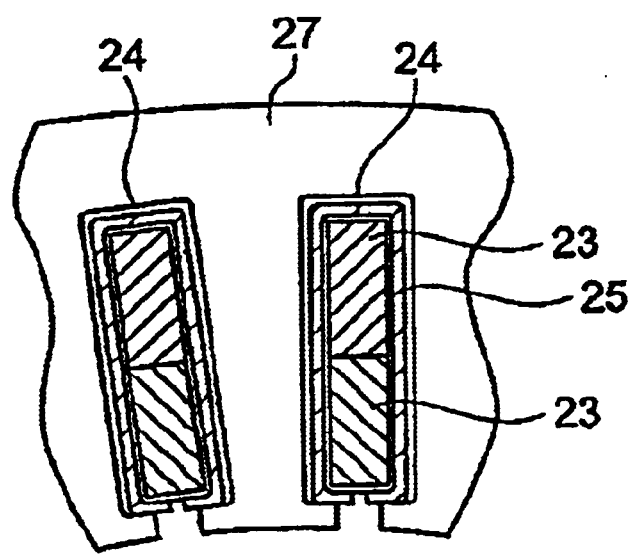
FIG. 14 is a cross-sectional view of a stator iron core of the conventional a.c. generator for vehicle.
Figure 15:
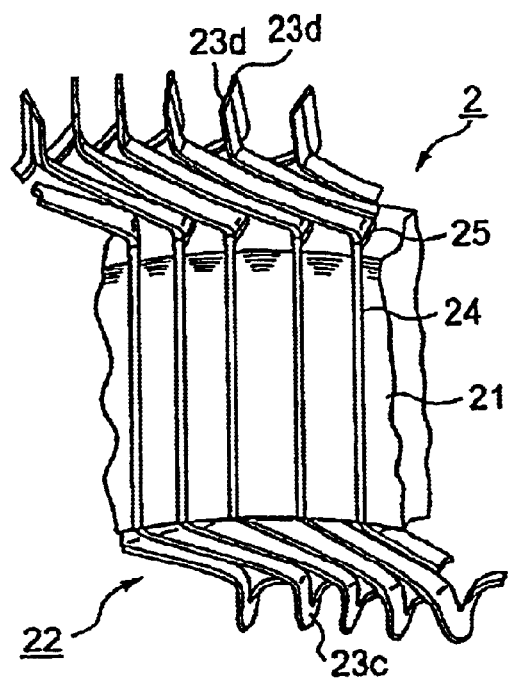
FIG. 15 is a perspective view of a part of a stator of the conventional a.c. generator for vehicle.
Figure 16:
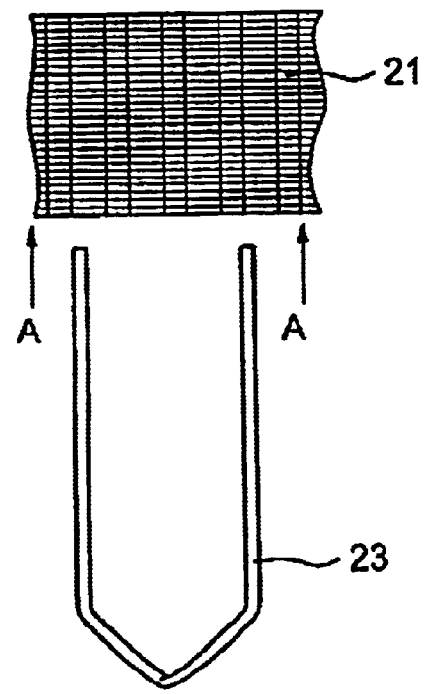
FIG. 16 illustrates a method of manufacturing a stator winding of the conventional a.c. generator for vehicle.
Figure 17:
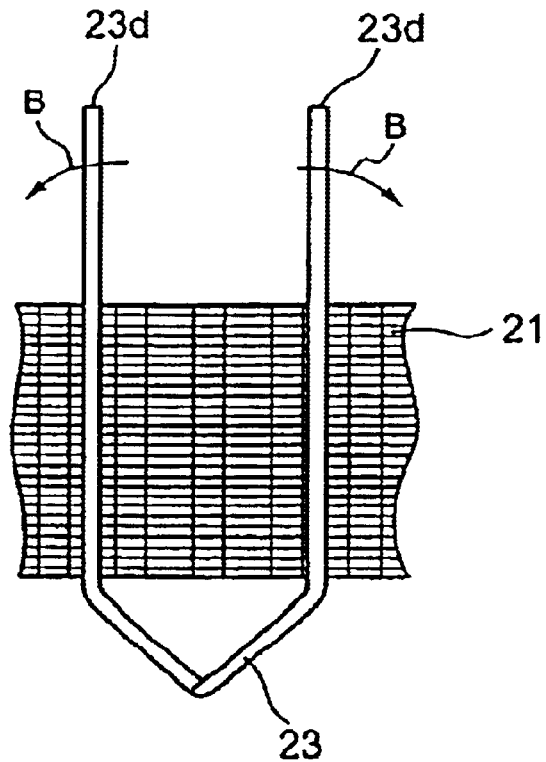
FIG. 17 illustrates the method of manufacturing the stator winding of the conventional a.c. generator for vehicle.
Figure 18:
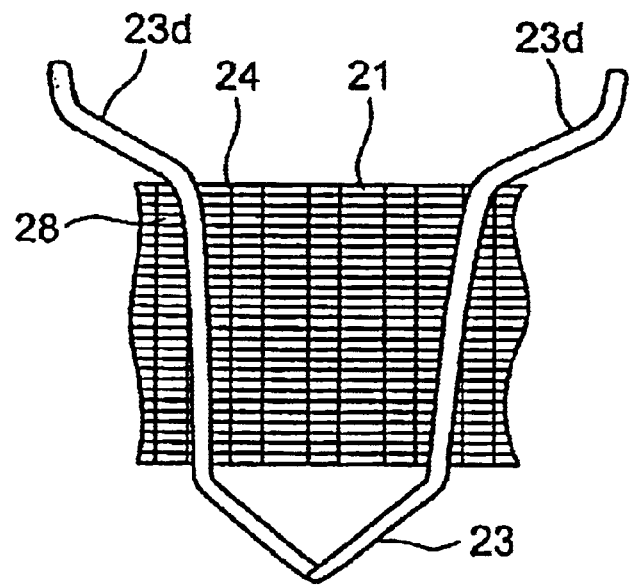
FIG. 18 illustrates the method of manufacturing the stator winding of the conventional a.c. generator for vehicle.

Further, as illustrated in FIG. 11, an effect similar to described above is obtainable by forming an uneven shape on an inner peripheral surface of the slot 24. For example, the uneven shape is formed by alternately laminating large steel plates 200 and small steel plates 200 in a peripheral direction of the stator iron core 21 at the teeth 28 when the stator iron core 21 is formed by laminating the steel plates 200, which are punched out to have a shape of the slots. In this case, two steel plates 200 having a smaller size in the peripheral direction may be used respectively on both ends of the stator iron core 21 at the end portions. Further, the uneven shape may be formed by alternatively offsetting steel plates 200 in a peripheral direction and laminating these. Further, as illustrated in FIG. 11, by forming shoulders of steel plates 200 to be in a rounded shape, the uneven shape may be formed.

The first advantage of the a.c. generator for the vehicle according to the present invention is that the insulating capability is high, the production becomes easy, and the production cost becomes low.

The second advantage of the a.c. generator for the vehicle according to the present invention is that the insulative coating is prevented from being damaged, and the insulating capability is improved.

The third advantage of the a.c. generator for the vehicle according to the present invention is that the coating of the insulative resin is easily provided on the opening edge of the slot so as to be in the rounded shape.

The fourth advantage of the a.c. generator for the vehicle according to the present invention is that the insulative resin on the opening edge of the slot and the vicinity thereof is prevented from being damaged, and the insulating capability is improved.

The fifth advantage of the a.c. generator for the vehicle according to the present invention is that the insulative resin is prevented from being damaged at the time of shaping, the conductor segments are easily bent to facilitate the production, and the cooling capability is improved.

The sixth advantage of the a.c. generator for the vehicle according to the present invention is that peeling of the insulative resin is prevented by making the contact between the end surface of the stator iron core and the insulative resin further tight.

The seventh advantage of the a.c. generator for the vehicle according to the present invention is that, because the insulative resin has an elasticity sufficient to avoid breakage by a pressure received at the time that the conductor segment is inserted in the slot, peeling and/or breakage of the resin, caused by a stress applied to the slot of the stator iron core at a time of inserting the conductor segment, is prevented, and therefore the insulating capability is improved.

The eighth advantage of the a.c. generator for the vehicle according to the present invention is that the electromagnetic sound is reduced by the effect of attenuating the vibration.

The ninth advantage of the a.c. generator for the vehicle according to the present invention is that the resin easily sweeps into the object to be coated, and is uniformly coated on the object.

The tenth advantage of the method of producing the a.c. generator for the vehicle according to the present invention is that the coating of the insulative resin is easily provided, the generator is easily produced, and the production cost becomes low.

The eleventh advantage of the method of producing the a.c. generator for the vehicle according to the present invention is that the insulative resin easily sweeps into the object to be coated to facilitate the uniform coating.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application JP2001-070080 filed on Mar. 13, 2001 including specification, claims, drawings and summary are incorporated herein by reference in its entirety.

What is claimed is:

1. An a.c. generator for a vehicle comprising:

a rotator;

a stator iron core, arranged opposite to an outer periphery of the rotator and having a plurality of slots; and a plurality of conductor segments accommodated in the slots to form a stator winding, wherein the stator iron core is insulated from the conductor segments by coating at least end surfaces of the stator iron core and inner wall surfaces of the slots with an insulative resin, wherein the number of the slots is at least two for each pole and each phase, and wherein the inner wall surfaces of the slots are shaped to be uneven.

2. The a.c. generator for the vehicle according to claim 1, wherein the coating of the insulative resin is provided around opening edges of the slots on sides of the end surfaces of the stator iron core so as to be in a rounded shape or a chamfered shape.

3. The a.c. generator for the vehicle according to claim 1, wherein the stator iron core has a rounded shape or a chamfered shape around opening edges of the slots on the sides of the end surfaces of the stator iron core.

4. The a.c. generator for the vehicle according to claim 2, wherein the stator iron core has a rounded shape or a chamfered shape around opening edges of the slots on the sides of the end surfaces of the stator iron core.

5. The a.c. generator for the vehicle according to claim 1, wherein the insulative resin is thicker at opening edges of the slots on sides of the end surfaces of the stator iron core than at center portions of the slots in an axial direction.

6. The a.c. generator for the vehicle according to claim 2, wherein the insulative resin is thicker at opening edges of the slots on sides of the end surfaces of the stator iron core than at center portions of the slots in an axial direction.

7. The a.c. generator for the vehicle according to claim 1, wherein the conductor segments have a substantially rectangular cross-sectional shape.

8. The a.c. generator for the vehicle according to claim 2, wherein the conductor segments have a substantially rectangular cross-sectional shape.

9. The a.c. generator for the vehicle according to claim 1, wherein the end surfaces of the stator iron core are shaped to be uneven.

10. The a.c. generator for the vehicle according to claim 2, wherein the end surfaces of the stator iron core are shaped to be uneven.

11. The a.c. generator for the vehicle according to claim 1, wherein the insulative resin is not broken at a time of inserting the conductor segments into the slots.

12. The a.c. generator for the vehicle according to claim 2, wherein the insulative resin is not broken at a time of inserting the conductor segments into the slots.

13. The a.c. generator for the vehicle according to claim 1, wherein the insulative resin includes silicone.

14. The a.c. generator for the vehicle according to claim 2, wherein the insulative resin includes silicone.

15. The a.c. generator fur the vehicle according to claim 1, wherein the insulative resin includes epoxy.

16. The a.c. generator for the vehicle according to claim 2, wherein the insulative resin includes epoxy.

* * * * *